No. 698,516. Patented Apr. 29, 1902.
E. KEMPSHALL.
PLAYING BALL.
(Application filed Mar. 26, 1902.)
(No Model.)

Witnesses:
Calderon C. Fuss.
R. W. Tillman

Inventor:
Eleazer Kempshall
By his Attorney
F. H. Richards

UNITED STATES PATENT OFFICE.

ELEAZER KEMPSHALL, OF BOSTON, MASSACHUSETTS, ASSIGNOR TO THE KEMPSHALL MANUFACTURING COMPANY, A CORPORATION OF NEW JERSEY.

PLAYING-BALL.

SPECIFICATION forming part of Letters Patent No. 698,516, dated April 29, 1902.

Application filed March 26, 1902. Serial No. 100,072. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Playing-Balls, of which the following a specification.

This invention relates to playing-balls, and especially to those used in the game of golf; and its object is to provide an effective and durable ball which will meet the various requirements of the game.

Figure 1:
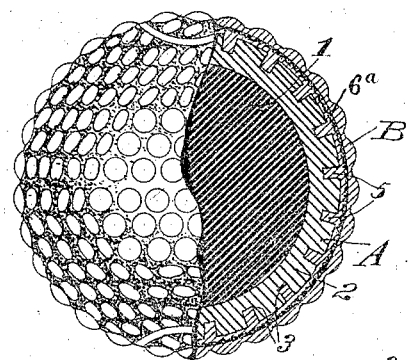
Figure 2:
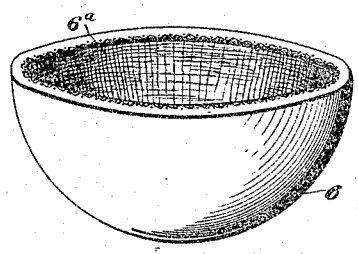
Figure 3:
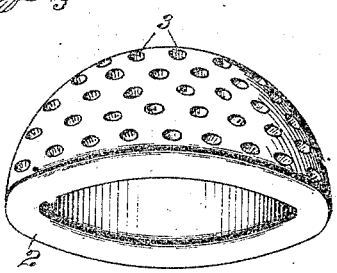
Figure 4:
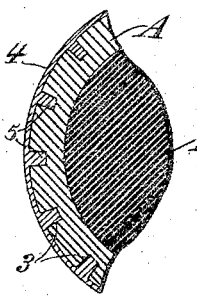
Figure 5:
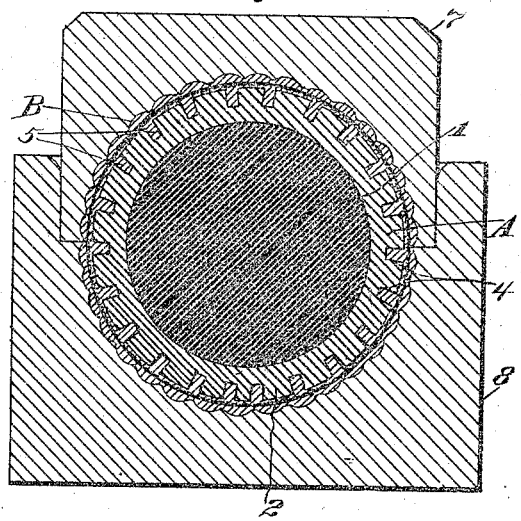
Figure 6:
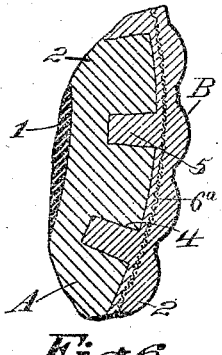

In the drawings forming part of this specification, Figure 1 is a view, partly in section, of a golf-ball made in accordance with my present improvements. Fig. 2 is a view of a cup or half-shell which is used to form the casing of the ball. Fig. 3 shows an indented hemisphere used within the casing and preferably forming the main portion of the shell. Fig. 4 is a diagram illustrating a stage in the process of manufacture. Fig. 5 illustrates the completion of the ball, and Fig. 6 is an enlarged fragment illustrating the relation of the several parts of the shell to each other and to the core.

In the several views similar parts are designated by similar characters of reference.

For the core of the ball I preferably employ a sphere 1 of highly-vulcanized soft rubber, and over this I compress and weld a pair of hemispherical plastic segments 2, consisting, preferably, of gutta-percha, although other material may be used. If desired, the core may be formed wholly of gutta-percha or wholly of rubber, or it may be built up in other ways within the scope of my present improvements. In the present instance the welded gutta-percha segments form the main portion A of the ball. In said shell portion or sphere A, I form indentations or perforations 3, preferably all over the outer surface thereof. These indentations may be formed in any suitable manner, either before or after the segments 2 are welded together over the rubber core 1. Upon the sphere A, I preferably spread a thin layer of celluloid 4, which enters the indentations or depressions 3, forming inturned teeth or hobs 5 all over the ball. This celluloid I allow to harden, so that the hobs may permanently retain their shape and position. The ball thus formed I inclose in hemispherical segments 6, consisting, preferably, of plastic material, preferably well-cured celluloid, lined with fabric 6ª, the celluloid being preferably very thin. The parts thus assembled I place between heating and compressing dies 7 and 8, whereby the celluloid shell is rendered plastic and caused to conform to the die, and the celluloid layer 4 is forced into the fabric and becomes keyed or embedded therein, so that the hobs 5 and 6 may be firmly jointed to or form parts upon the celluloid casing, whereby the latter is firmly keyed upon or interlocked with the gutta-percha sphere A. The compression indicated at Fig. 5 is maintained until the shell cools and hardens. Thus it will be seen that I form at small expense a ball having a substantial shell of gutta-percha faced with celluloid, gaining the advantages of the latter and also preserving the advantage of a gutta-percha shell.

It is understood that the celluloid casing B, Fig. 1, is not only keyed upon the gutta-percha shell A, but also that the segments 6, of which the casing is formed, are welded at their edges, and also that the inturned hobs prevent the celluloid shell from becoming disrupted from the ball in case there should be a break at the joint of the segments 6.

Other material of the celluloid or pyroxylin class or even other plastic material—such, for instance, as gutta-percha—may be used for the casing B, and many other variations may be made within the scope of my present improvements.

Having described my invention, I claim—

1. A playing-ball having a core and a shell thereon, said shell consisting of fabric and plastic material and having inturned hobs or teeth which engage said core.

2. A playing-ball having a sphere of gutta-percha and a casing of celluloid thereon; said casing having inturned hobs which penetrate the gutta-percha.

3. A playing-ball having a sphere of gutta-percha and a casing of celluloid and fabric thereon; said casing having inturned hobs which penetrate the gutta-percha.

4. A playing-ball comprising a rubber sphere, gutta-percha sphere thereon, and a casing upon said gutta-percha sphere; said casing consisting of celluloid and fabric and having inturned hobs which penetrate said gutta-percha, and both said gutta-percha and said celluloid being compressed upon said rubber sphere.

ELEAZER KEMPSHALL.

Witnesses:
B. C. STICKNEY,
E. J. W. CLARKSON.